(12) United States Patent
White, III

(10) Patent No.: US 7,477,837 B2
(45) Date of Patent: Jan. 13, 2009

(54) LIQUID FLOW SENSOR

(75) Inventor: Robert E. White, III, St. Petersburg, FL (US)

(73) Assignee: Dolphin Industries, Inc., Palm Harbor, FL (US)

( * ) Notice: Subject to any disclaimer, the term of this patent is extended or adjusted under 35 U.S.C. 154(b) by 233 days.

(21) Appl. No.: 11/555,999

(22) Filed: Nov. 2, 2006

(65) Prior Publication Data

US 2008/0105047 A1    May 8, 2008

(51) Int. Cl.
*F24H 1/10* (2006.01)

(52) U.S. Cl. ........................... 392/485; 340/606

(58) Field of Classification Search .................. None
See application file for complete search history.

(56) References Cited

U.S. PATENT DOCUMENTS

| | | | |
|---|---|---|---|
| 2,957,069 A | 10/1960 | Dammond | |
| 3,351,739 A | 11/1967 | Eckman | |
| 3,795,789 A | 3/1974 | Malzoni | |
| 4,288,685 A | 9/1981 | Tommaso | |
| 4,604,515 A | 8/1986 | Davidson | |
| 4,638,147 A | 1/1987 | Dytch et al. | |
| 4,900,896 A | 2/1990 | Maus | |
| 5,129,034 A | 7/1992 | Sydenstricker | |
| 5,228,469 A * | 7/1993 | Otten et al. | 137/80 |
| 5,408,578 A | 4/1995 | Bolivar | |
| 5,479,558 A | 12/1995 | White, Jr. et al. | |
| 6,333,695 B2 * | 12/2001 | Young | 340/606 |
| 6,552,283 B2 | 4/2003 | Cabrera et al. | |
| 6,643,454 B1 | 11/2003 | Rochelle | |
| 6,914,531 B1 * | 7/2005 | Young | 340/606 |
| 2005/0185942 A1 * | 8/2005 | Fabrizio | 392/485 |

FOREIGN PATENT DOCUMENTS

GB    471730    9/1937

* cited by examiner

*Primary Examiner*—Thor S Cambell
(74) *Attorney, Agent, or Firm*—Larson & Larson; Frank Liebenow

(57) ABSTRACT

A flow detection sensor has a manifold with an inlet on a bottom surface and an outlet on a side surface. A movable partial blockage rests near the bottom surface of the manifold and is movable upward in response to a flow of liquid from the inlet to the outlet. A sensor detects the position of the movable partial blockage within the manifold.

20 Claims, 7 Drawing Sheets

LIQUID FLOW SENSOR

CROSS-REFERENCE TO RELATED APPLICATION

This application is related to U.S. non-provisional utility application titled, "TANKLESS WATER HEATER," which was filed on even date herewith; and inventor Robert E. White, III.

BACKGROUND OF THE INVENTION

1. Field of the Invention

The present invention relates to the field of sensing the flow of a liquid and more particularly to a highly sensitive liquid flow detector.

2. Description of the Related Art

Liquid flow detectors are often used to detect the flow of water in water heaters. Electrically operated water heaters generally are known in the prior art and have numerous common features. The most common water heater used today is a water heater having a storage tank. In this, a supply or tank of water is pre-heated by an electric heating element or combustion of fossil fuel so that hot water is available shortly after a hot-water spigot is opened. Storage-tank water heaters waste energy in that there is substantial energy lost by radiation and conduction of the hot water stored in their storage tank, sometimes 40 or 50 gallons. The radiated energy also taxes air conditioning systems. Several attempts have been made to reduce this waste, including enhanced insulation for reducing radiated heat lost and using timers to disable the heating elements during night hours.

Recently, tankless, or instantaneous, heaters have been deployed for heating water on demand. There are several major advantages in tankless water heaters. The first is, because there is no pre-heated water, there is very little energy loss due to heat radiated from the pre-heated water. Second, the tankless water heaters are smaller, requiring fewer raw materials and requiring fewer resources in shipment. Third, the tankless water heaters occupy less space in homes, apartments, retail outlets, warehouses etc.

Several U.S. patents cover various aspects of tankless water heaters. U.S. Pat. No. 3,351,739, issued to Eckman has a tankless water heater with staged energization of electrical heating elements and a high temperature cutout switch.

U.S. Pat. No. 3,795,789, issued to Malzoni has a tankless water heater with a flow switch and electric heating elements.

U.S. Pat. No. 4,604,515, issued to Davidson and U.S. Pat. No. 4,638,147, issued to Dytch et al. include a solid state switch to control electrical current to the heating elements. Dytch mounts the solid state switch on a wall of the heating chamber, thereby cooling the switch while recovering generated heat. Dytch also teaches locating a temperature sensor at the outlet of the heater.

U.S. Pat. No. 5,479,558 to White, Jr., et al describes a flow-through tankless water heater with a flow switch. The flow switch has an arm and a ball joint, but requires significant water flow to energize the flow switch.

U.S. Pat. No. 6,552,283 to Cabrera describes a flow-switch. The flow switch has a floating magnetic set of balls that have a specific gravity higher than water yet will float upwardly in a pipe when water flows, thereby coming into proximity with a magnetic switch and energizing the heating elements. The floating set of magnetic balls must be retained within the pipe to prevent them from flowing out of the water heater. Unfortunately, this requires screens within the flow of water which, in many circumstances, corrode or clog during use.

GB 471,730 to Shepherd describes a flow switch for a tankless water heater. The flow switch of this patent has a plunger in a cylinder that, when water flows, is pushed downward, activating a mercury switch to power the heating elements. This switch uses a spring to urge the plunger back into the resting mode, thereby removing power from the heating elements. The use of a spring is problematic, in that the spring can break or corrode, thereby resulting in continuous power to the heating elements.

None of the above inventions and patents, taken either singly or in combination, is seen to describe the instant invention as claimed. What is needed is a liquid flow detector that detects a small amount of liquid flow and has limited components that are exposed to the liquid, reducing failure due to corrosion and clogging.

SUMMARY OF THE INVENTION

It is an objective of the present invention to provide a flow sensor that will detect the flow of a liquid such as water.

It is a further objective of the present invention to provide a flow sensor that will detect very small amounts of flow.

It is a further objective of the present invention to provide a flow sensor that has few moving parts exposed to any liquid, reducing corrosion and contaminate build-up.

In one embodiment, a flow detection sensor is disclosed including a manifold with an inlet on a bottom surface, an outlet on a side surface and a magnetic sensor situated on an upper surface. A plunger rests on the bottom surface of the manifold and has an imbedded magnet. The plunger partially obstructs the flow of a liquid from the inlet when the liquid is still and lifts upwardly within the manifold to a closer proximity with the magnetic sensor when the liquid flows, whereas the magnetic sensor detects the closer proximity of the imbedded magnet and changes electrical state.

In another embodiment, a method of detecting a flow of a liquid is disclosed including providing a flow sensor with a manifold that has an inlet on a bottom surface, an outlet on a side surface and a magnetic sensor situated on an upper surface. A plunger movable within the manifold has an imbedded magnet and rests on the bottom surface of the manifold, partially obstructing the flow of liquid from the inlet when the liquid is still. The method continues with the start of flow of the liquid at which time the plunger rises within the manifold to a closer proximity with the magnetic sensor. Correspondingly, the magnetic sensor detects a magnetic field of the imbedded magnet and changes its output from a first state indicative of no flow to a second state indicative of the flow.

In another embodiment, a flow detection sensor is disclosed including a manifold with an inlet on a bottom surface and an outlet on a side surface. A movable partial blockage rests near the bottom surface of the manifold and is movable upward in response to a flow of liquid from the inlet to the outlet. A sensor detects the position of the movable partial blockage within the manifold.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
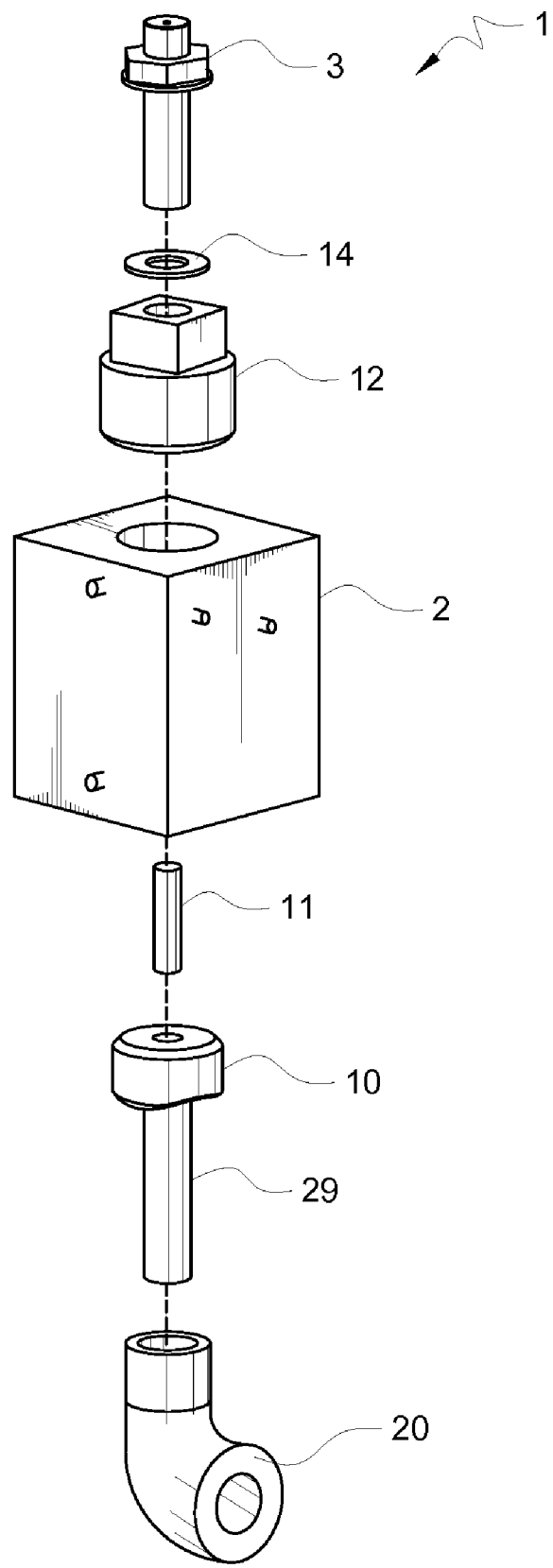
FIG. 1 illustrates an exploded view of a flow sensor of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an exploded view of a flow sensor of the present invention will be described. The flow sensor 1 detects minute volumes of water flowing in from the inlet pipe (elbow) 20 and out the outlet pipe 8 (not visible in FIG. 1). The flow of water is detected by a plunger 10 (a movable partial obstruction) that is held by gravity on an edge of the inlet pipe 20 (or on the bottom surface of the flow sensor manifold 4) when no water flow occurs. When water flow begins, the plunger 10 rises within the flow sensor manifold 2, approaching a magnetic sensor 3. In the preferred embodiment, the plunger 10 has a stem 29 that rests in the inlet pipe 20 and helps prevents the plunger 10 from exiting the inlet pipe 20 as it rises. In the preferred embodiment, the plunger 10 has a magnet 11 that, when in proximity of the magnetic sensor 3, energizes the magnetic sensor 3, either opening a circuit or closing a circuit or changing the impedance of the magnetic sensor's 3 output. The magnetic sensor 3 is held in place by, for example, threads, a fitting 12 and a washer 14, thereby preventing leakage of water. The fitting 12 is adapted to the flow sensor manifold 2 by any way known in the industry. Although other configurations and mountings of the sensor are equally anticipated, it is preferred to use a threaded mounting such that the sensor 3 is adjustable within the flow sensor manifold 2, thereby providing a range of flow volume trigger points. For example, if the magnetic sensor 3 is lowered close to the plunger 10, the flow sensor 1 triggers at a very slight amount of flow. Likewise, if the magnetic sensor 3 is raised away from the plunger 10, the flow sensor 1 triggers at a higher amount of flow.

There are many types of magnetic sensors 3 known in the industry including reed relays, inductors and Hall Effect sensors. The magnetic sensor 3 is preferably a magnetic switch that is in one state (e.g., off) in absence of a magnetic field and in another state (e.g., on) in presence of a magnetic field. Other magnetic sensors 3 work equally as well. For example, an inductive sensor includes a coil of wire that changes impedance corresponding to the proximity of a magnetic material (ferrous material) such as iron or steel. With such a sensor, circuitry is added to operate the solid state relay (discussed later) in response to an impedance change.

Figure 2:
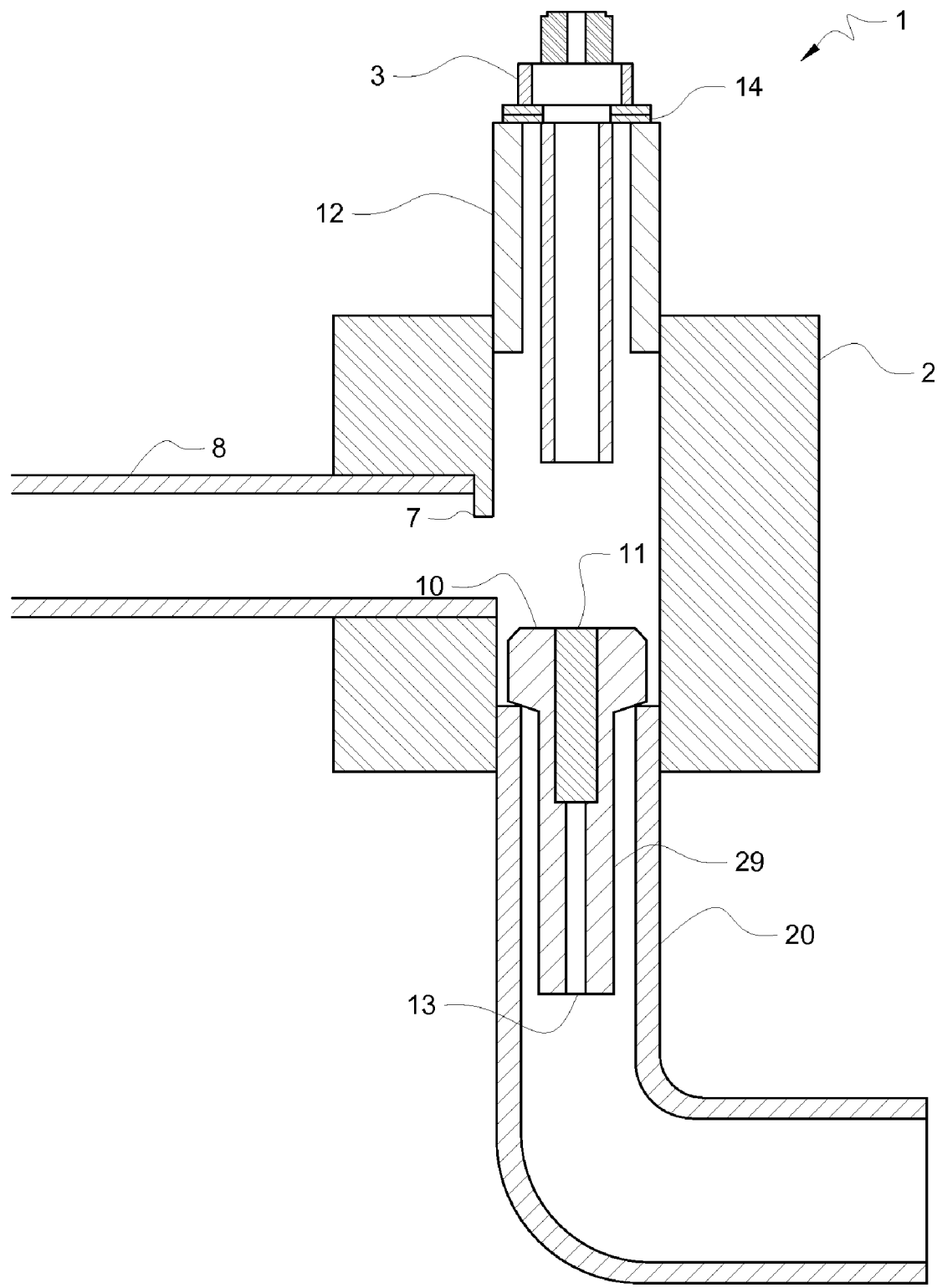
FIG. 2 illustrates a cross sectional view of a flow sensor of the present invention.

Referring to FIG. 2, a cross sectional view of a flow sensor of the present invention is described. In this figure, no water (fluid) is flowing through the inlet pipe 20 through the flow sensor manifold 2 and out the outlet pipe 8. The plunger 10 is, therefore, resting by forces of gravity on the rim of the input pipe 20, though in other embodiments, the plunger 10 rests on any other suitable surface, including a lower surface of the flow sensor manifold 2.

The plunger 10 has a magnet 11 for magnetically engaging with the magnetic sensor 3, though the magnetic sensor 3 is not energized in this mode since water (fluid) is not flowing and the plunger 10 with magnet 11 is outside of the range of influence of the magnetic sensor 3. In other words, the magnetic sensor 3 is not stimulated by the magnet 11 because the magnet 11 is outside the range of operation of the magnetic sensor 3. Many factors influence the engagement of the magnetic sensor 3 with the magnet 11, including the strength of the magnet 11, the distance between the magnet 11 and the magnetic sensor 3 and the sensitivity of the magnetic sensor 3. For the flow sensor 1 of the present invention to operate, these parameters are selected such that the magnetic sensor 3 is in a first state when there is no flow and the plunger 10 is held by gravity against the input pipe 20 or bottom area of the manifold 2 and the magnetic sensor 3 is in a second state when there is flow and the plunger 10 is lifted away from the input pipe 20 of bottom area of the manifold 2 by the flow. In some embodiments, the magnetic sensor 3 is a normally open switch that closes in proximity to a magnet. In other embodiments, the magnetic sensor 3 is a normally closed switch that opens in proximity to a magnet. In still other embodiments, the magnetic sensor 3 has a variable impedance or resistance that changes proportionally to the proximity to the magnet.

In some embodiments, a lip 7 is formed in the wall of the flow sensor manifold 2 partially blocking the output pipe 8 so that the plunger 10 doesn't lift out of its seat (input pipe 20) and move into the output pipe 8 or clog the output pipe 8. In preferred embodiments, the plunger 10 has a stem 29 that extends downward into the inlet pipe 20, thereby holding the plunger upright and helping to prevent the plunger 10 from escaping the flow sensor manifold 2.

In some embodiments, an anti-vacuum tube 13 is drilled or formed in the stem 29 of the plunger 10 to assist in the insertion of the magnet 11. In the preferred embodiment, the magnet 11 is press-fit into the plunger 10, and without the anti-vacuum tube 13, air caught when inserting the magnet 11 can create pressure that can work to push the magnet 11 out of the plunger 10. The anti-vacuum tube 13 eliminates this pressure. In alternate embodiments, the magnet 11 is installed into the plunger 10 in a vacuum environment or the magnet 11 is bonded to the plunger 10 with an adhesive. The fitting 12 and washer 14 are shown for completeness.

Figure 3:
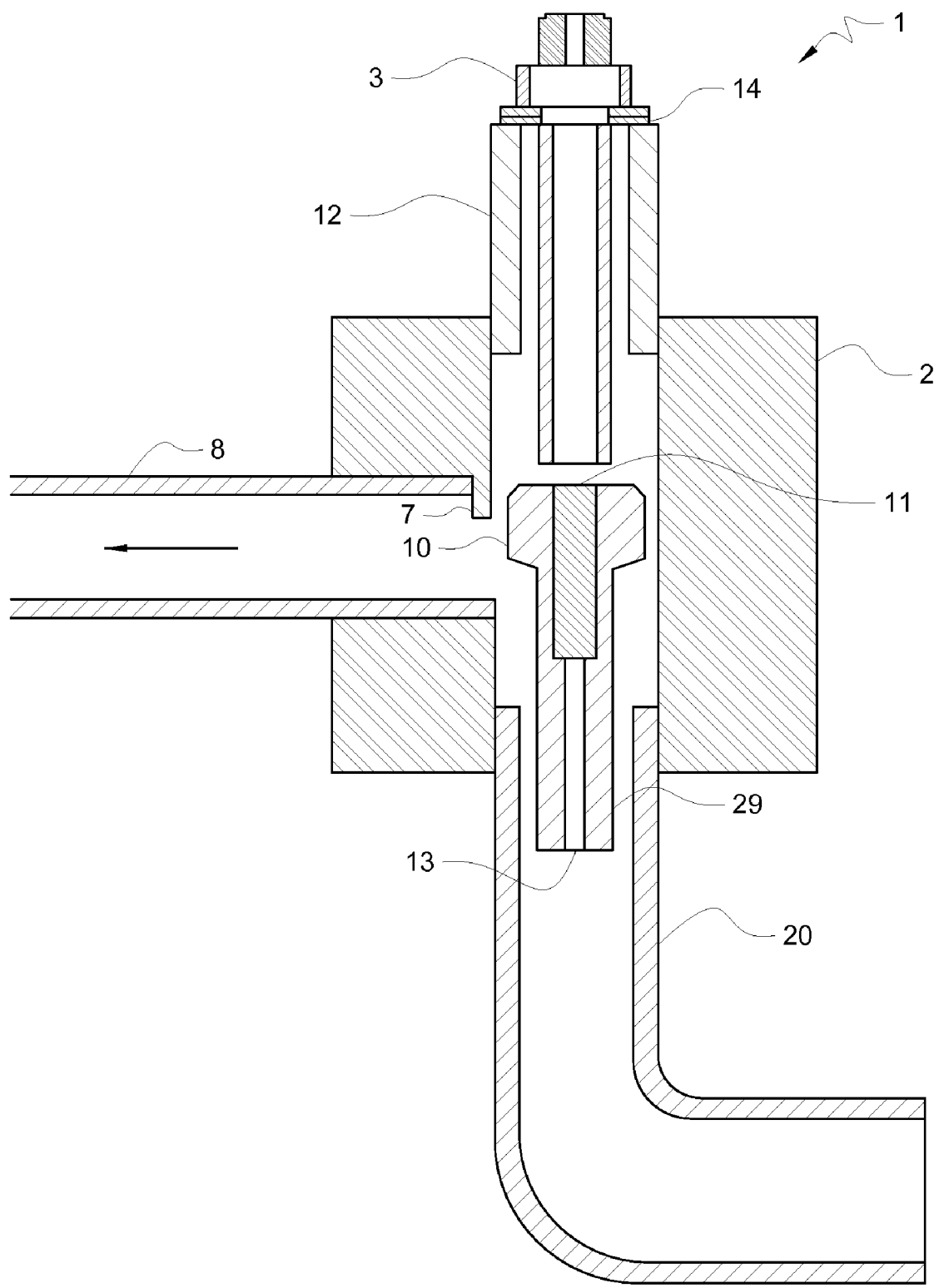
FIG. 3 illustrates a cross sectional view of a flow sensor of the present invention during water flow.

Referring to FIG. 3, a cross sectional view of a flow sensor of the present invention during water flow will be described. In this figure, water (fluid) is flowing through the inlet pipe 20 through the flow sensor manifold 2 and out the outlet pipe 8. The plunger 10 is, therefore, lifted by the flow, off the rim of the input pipe 20.

As the plunger 10 rises in response to the flow of liquid from the inlet pipe 20 to the outlet pipe 8, the magnet 11 of the plunger 10 magnetically engages with the magnetic sensor 3. The magnetic sensor 3 is thereby stimulated by the magnet 11 because the magnet 11 is now within the range of operation of the magnetic sensor 3.

Again, in some embodiments, a lip 7 is formed in the wall of the flow sensor manifold 2 partially blocking the output pipe 8 so that the piston 10 doesn't lift out of its seat (input pipe 20) and move into the output pipe 8 or clog the output pipe 8.

Figure 4:
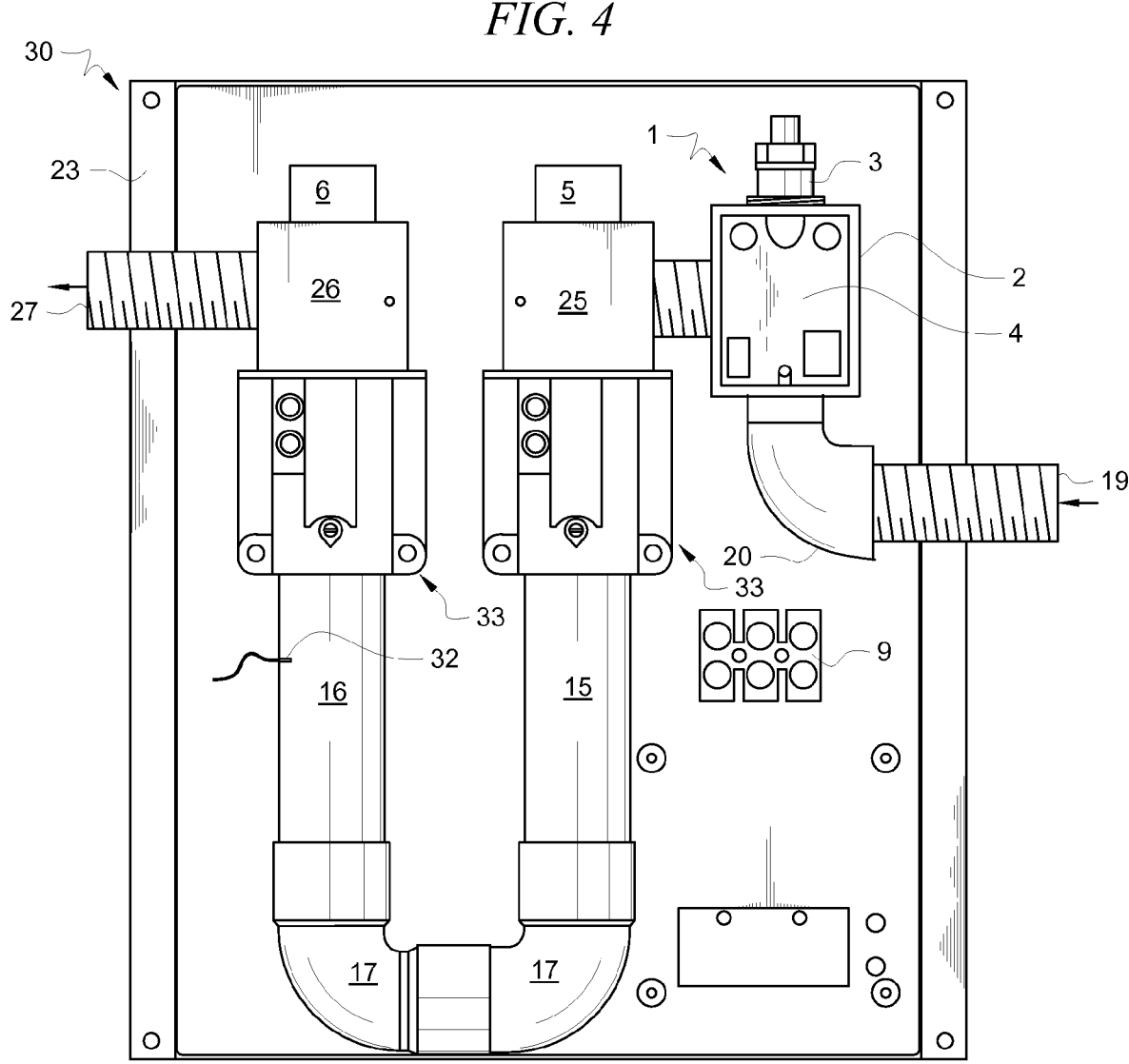
FIG. 4 illustrates a pictorial view of a tankless water heater of the present invention.

Referring to FIG. 4 a pictorial view of a tankless water heater utilizing the flow sensor 1 previously described is shown. In this embodiment, the components are mounted and secured to a chassis panel 23. Water enters the tankless water heater 30 through an input conduit 19 and inlet pipe fitting 20, entering the flow sensor manifold 2. The magnetic sensor 3 detects magnetic flux when water flows and the plunger 10 with magnet 11 (not visible) rises into its proximity. The magnetic sensor 3 is coupled to a solid state relay 4, signaling it to energize. The solid state relay 4 is controlled by the magnetic sensor 3 and a thermocouple 32. The magnetic sensor 3 energizes the solid state relay 4 when water flows and the thermo-couple 32 controls the amount of current flowing through the solid state relay 4 based upon the output water temperature. Solid state relays are well known in the industry and often used in electric water heaters of all types.

When a hot water tap connected to the tankless water heater 30 is opened and water flows, the cold water flows out of the flow sensor manifold 2 and into a first heater manifold 25, through a first heating chamber 15, through connecting pipes 17 into a second heating chamber 16 and into a second heater manifold 26 before exiting the tankless water heater 30 through an outlet pipe 27. Within the first heating chamber 15 is a first heating element 5 and within the second heating chamber 16 is a second heating element 6.

When water flows, the flow sensor 1 detects such and the magnetic sensor 3 signals the solid state relay 4 to close, thereby providing electric current to the heating elements 5/6. The heating elements are, preferably, standard, submersible, electric heating elements as known in the industry. As the water is heated, the thermocouple 32 measures the water temperature at the outlet of the tankless water heater 30. If the temperature rises above a predetermined level, the solid state relay 4 is signaled to reduce the current to one or both of the heating elements 5/6, thereby regulating the output temperature.

In some embodiments, thermal safety switches 33, in thermal conductivity with the heating chambers 15/16 monitor the temperature of the chambers 15/16 and, if a high-temperature threshold is exceeded, power is interrupted to the heating elements 5/6, preventing overheating, excessive pressure and other related problems.

Also shown for completeness is a power terminal block 9. Normally, 220V AC household power is provided by three wires, two hot legs and a neutral. The power terminal block 9 connects the incoming power to the various components of the tankless water heater 30. Details of these connections are shown in FIGS. 6 and 7.

Figure 5:
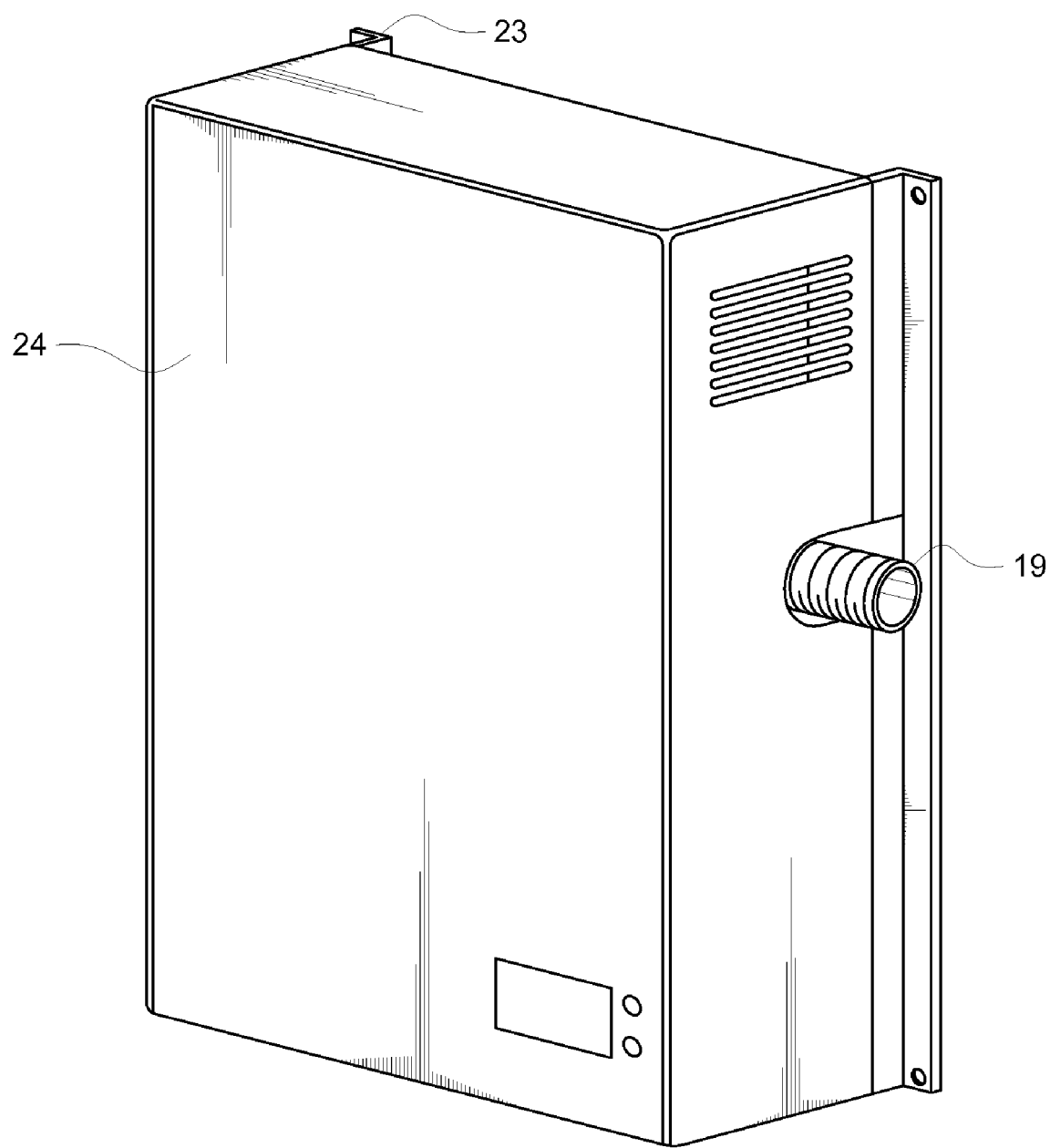
FIG. 5 illustrates a pictorial view of an enclosure of a tankless water heater of the present invention.

Referring to FIG. 5, a pictorial view of an enclosure of a tankless water heater of the present invention will be described. The inlet 19 passes through a cover 24 of the enclosure. The chassis panel 23 is covered by the cover 24. The outlet and power connections are not visible.

Figure 6:
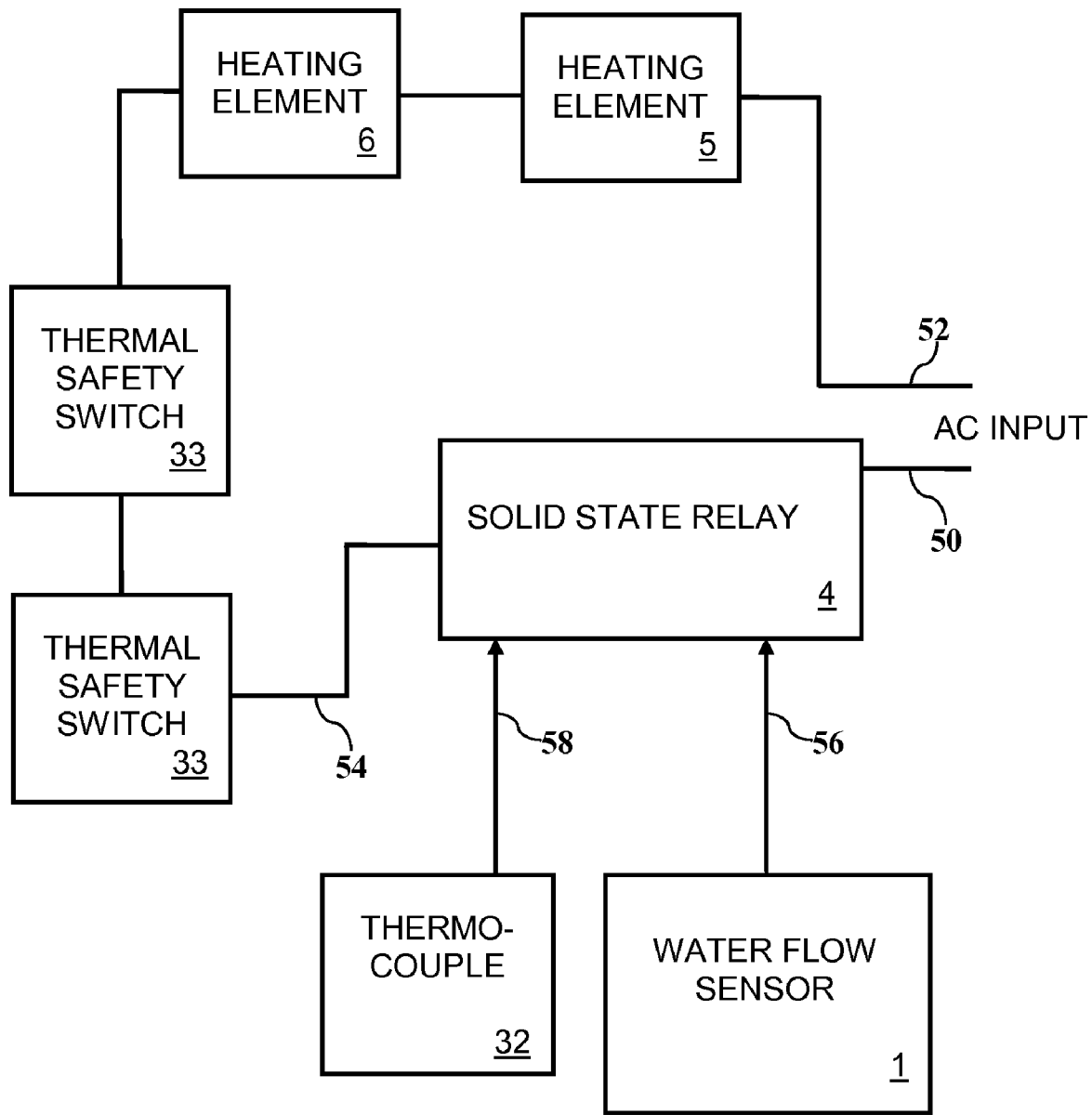
FIG. 6 illustrates a schematic diagram of a tankless water heater of the present invention.
Figure 7:
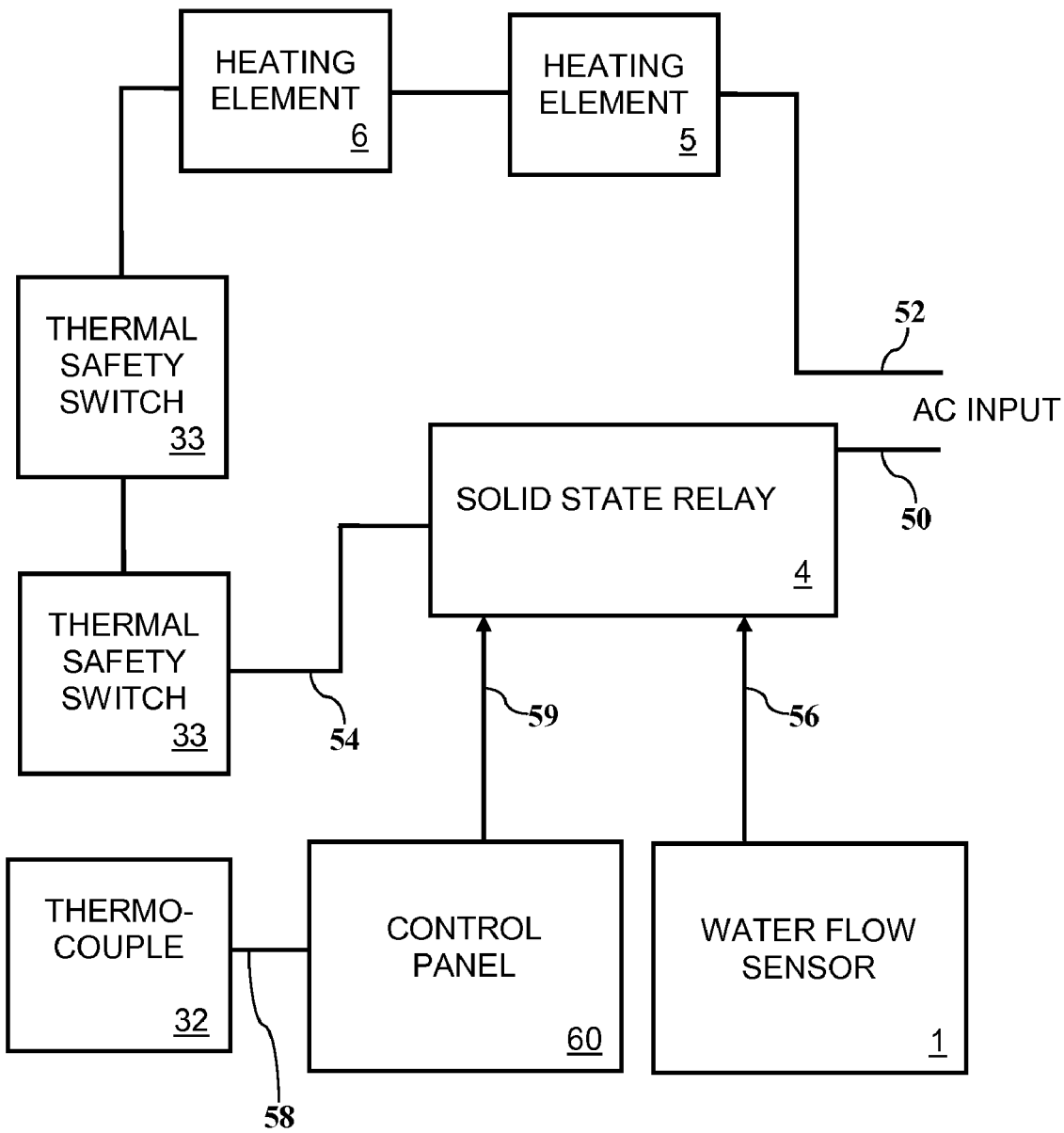
FIG. 7 illustrates a schematic diagram of a tankless water heater of a second embodiment of the present invention.

Referring to FIG. 6, a schematic diagram of the electrical connections of a first embodiment of the present invention is shown. One leg of the AC power 50 enters the tankless water heater 30 through the solid state relay 4. Although shown as AC, in some countries, DC power is used. It is preferred that the AC voltage be 220V at 50 or 60 Hz, though any voltage and frequency can be used. In this embodiment, the solid state relay 4 is controlled by input 56 from the water flow sensor 1 and input 58 from the temperature sensing thermo-couple 32. When water is flowing, the water flow sensor 1 signals the solid state relay 4 to close or start the flow of current through the series path between its power output 54, through the thermal safety switches 33, through the heating elements 5/6 and back to the other leg of the AC power 52. As current flows, the heating elements 5/6 heat the water. The thermocouple 32 detects the output temperature of the tankless water heater 30 and as it reaches the desired temperature, signals the solid state relay 4 to reduce the current flowing through the heating elements 5/6. In some embodiments, the solid state relay 4 continuously varies the current through the heating elements 5/6 depending upon the water temperature detected by the thermocouple 32. In other embodiments, the solid state relay 4 varies the current in steps (e.g., 100%, 90%, 80%, etc). In some embodiments, the solid state relay 4 is only capable of switching the current on or off.

The thermal safety switches 33 are normally closed thermal switches that open if the temperature of the heating chambers 15/16 exceed a specified temperature, for example 140 degrees Fahrenheit. Thermal safety switches 33 are known in the industry and usually consist of a bi-metallic disc that, when heated over a threshold temperature, deform and interrupts the flow of electricity.

Referring to FIG. 7, a schematic diagram of the electrical connections of a second embodiment of the present invention is shown. As in the first embodiment, one leg of the AC power 50 enters the tankless water heater 30 through the solid state relay 4. Although shown as AC, in some countries, DC power is used. It is preferred that the AC voltage be 220V at 50 or 60 Hz, though any voltage and frequency can be used. In this embodiment, the solid state relay 4 is controlled by input 56 from the water flow sensor 1 and input 59 from the control panel 60. When water is flowing, the water flow sensor 1 signals the solid state relay 4 to close or start the flow of current through the series path between its power output 54, through the thermal safety switches 33, through the heating elements 5/6 and back to the other leg of the AC power 52. As current flows, the heating elements 5/6 heat the water.

In this embodiment, the thermocouple 32 measures the output temperature of the tankless water heater 30 and provides a proportional electrical signal 58 to a control panel 60. Such control panels are known in the industry. In some embodiments the control panel 60 includes a mechanism to set the water temperature to a desired value such as 105 degrees Fahrenheit. In some embodiment the control panel also includes a display to indicate the water temperature setting. As the water temperature reaches the set temperature, the control panel signals the solid state relay 4 through its output 59 to reduce the current flowing through the heating elements 5/6. In some embodiments, the solid state relay 4 continuously varies the current through the heating elements 5/6 depending upon the water temperature detected by the thermo-couple 32. In other embodiments, the solid state relay 4 varies the current in steps (e.g., 100%, 90%, 80%, etc). In some embodiments, the solid state relay 4 is only capable of switching the current on or off.

As in the first embodiment, the thermal safety switches 33 are normally closed thermal switches that open if the temperature of the heating chambers 15/16 exceed a specified temperature, for example 140 degrees Fahrenheit. Thermal safety switches 33 are known in the industry and usually consist of a bi-metallic disc that deform and interrupts the flow of electricity when heated above a threshold temperature.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A flow detection sensor comprising:
   a manifold;
   an inlet on a bottom surface of the manifold;
   an outlet on a side surface of the manifold;
   a magnetic sensor situated on an upper surface of the manifold a depth of the magnetic sensor adjustable from outside of the manifold thereby enabling an adjustment of sensitivity; and
   a plunger having an imbedded magnet, the plunger adapted to rest on a rim within the manifold, the plunger urged toward the rim solely by a force of gravity and the plunger partially obstructing a flow of a liquid from the inlet to the outlet when the liquid is still, the plunger having a surface interfacing with the rim wherein the surface angles upwardly towards an outer circumference of the plunger, the plunger lifting within the manifold to a closer proximity with the magnetic sensor when the liquid flows from the inlet to the outlet, whereas the magnetic sensor detects the closer proximity of the imbedded magnet and the magnetic sensor changes electrical state.

2. The flow detection sensor of claim 1, wherein the magnetic sensor includes a reed relay.

3. The flow detection sensor of claim 1, wherein the magnetic sensor includes a Hall Effect detector.

4. The flow detection sensor of claim 1, wherein the magnetic sensor is positionally adjustable from outside of the sensitive flow sensor to varying distances between the magnetic sensor and the plunger.

5. The flow detection sensor of claim 1, wherein the plunger comprises a stem, the stem rests within and partially blocks the inlet.

6. The flow detection sensor of claim 1, wherein the imbedded magnet is press-fit into the plunger.

7. The flow detection sensor of claim 1, wherein a lip partially blocks the outlet thereby preventing the plunger from exiting the manifold.

8. A method of detecting a flow of a liquid, the method comprising:
   providing a flow sensor, the flow sensor comprising:
      a manifold;
      an inlet on a bottom surface of the manifold;
      an outlet on a side surface of the manifold;
      an adjustable magnetic sensor situated on an upper surface of the manifold, the depth of the adjustable magnetic sensor within the manifold adjustable from outside of the manifold; and
      a plunger having an imbedded magnet, an interface surface of the plunger adapted to rest on an internal surface of the manifold and the plunger partially obstructing the flow of the liquid from the inlet to the outlet when the liquid is still, the plunger urged toward a closed position solely by a force of gravity and the interface surface angled upwardly towards an outer circumference of the plunger;
   starting the flow of the liquid;
   the plunger rising within the manifold to a closer proximity with the adjustable magnetic sensor; and
   the adjustable magnetic sensor detecting a magnetic field of the imbedded magnet, the adjustable magnetic sensor thereby changing an output from a first state indicative of no flow to a second state indicative of the flow.

9. The method of claim 7, wherein the first state is high impedance and the second state is low impedance.

10. The method of claim 7, wherein the adjustable magnetic sensor is a Reed relay and the first state is open and the second state is closed.

11. A flow detection sensor comprising:
    a manifold;
    an inlet on a bottom surface of the manifold;
    an outlet on a side surface of the manifold;
    a movable partial blockage adapted to rest on an internal surface of the manifold, the movable partial blockage movable upward in response to a flow of liquid from the inlet to the outlet, the movable partial blockage movable downwards in response to an abatement of the flow of water, the movable partial blockage urged downward solely by the force of gravity; and
    a means for detecting a position of the movable partial blockage, a depth within the manifold of the means for detecting adjustable from outside of the manifold.

12. The flow detection sensor of claim 11, wherein the means for detecting is a magnetic sensor.

13. The flow detection sensor of claim 12, wherein the magnetic sensor is a Reed relay.

14. The flow detection sensor of claim 11, wherein the means for detecting is a Hall Effect detector.

15. The flow detection sensor of claim 11, wherein the means for detecting is positionally adjustable from outside of the sensitive flow sensor to vary a distance between the means for detecting and the movable partial blockage.

16. The flow detection sensor of claim 11, wherein the movable partial blockage comprises a plunger.

17. The flow detection sensor of claim 16, wherein the plunger further comprises a stem.

18. The flow detection sensor of claim 11, wherein the movable partial blockage is made of a ferrous material and the means for detecting is a coil of wire, an impedance of the coil of wire changes based upon proximity to the movable partial blockage.

19. The flow detection sensor of claim 11, wherein the movable partial blockage includes an imbedded magnet and the means for detecting is a magnetic proximity sensor.

20. The flow detection sensor of claim 11, further comprising a means for partially blocking the outlet thereby preventing the movable partial blockage from exiting the manifold.

* * * * *